United States Patent
Özcan

(10) Patent No.: US 6,427,754 B1
(45) Date of Patent: Aug. 6, 2002

(54) PROCESS AND DEVICE FOR PRODUCING A BRAKE DRUM OR BRAKE DISC

(75) Inventor: Kenan Özcan, Meschede (DE)

(73) Assignee: Honsel AG (DE)

( * ) Notice: Subject to any disclaimer, the term of this patent is extended or adjusted under 35 U.S.C. 154(b) by 0 days.

(21) Appl. No.: 09/214,136

(22) PCT Filed: Jun. 21, 1997

(86) PCT No.: PCT/EP97/03269

§ 371 (c)(1),
(2), (4) Date: Jun. 25, 1999

(87) PCT Pub. No.: WO98/00254

PCT Pub. Date: Jan. 8, 1998

(30) Foreign Application Priority Data

Jun. 29, 1996 (DE) .......................... 196 26 175

(51) Int. Cl.[7] .............................................. B22D 19/02
(52) U.S. Cl. ..................... 164/95; 164/113; 164/312; 164/94
(58) Field of Search ............................. 164/94, 95, 113, 164/312, 313, 900, 332, 333

(56) References Cited

U.S. PATENT DOCUMENTS

| | | | |
|---|---|---|---|
| 4,005,991 A | 2/1977 | Uebayasi et al. | ........... 29/196.2 |
| 4,023,613 A | 5/1977 | Uebayasi et al. | ........... 164/100 |
| 4,436,139 A | 3/1984 | Strader | ....................... 164/112 |
| 4,444,296 A * | 4/1984 | Marianu | ..................... 188/72.2 |
| 4,576,775 A * | 3/1986 | Kaeufer et al. | ............. 264/323 |
| 4,705,093 A | 11/1987 | Ogino | ......................... 164/97 |
| 4,726,415 A | 2/1988 | Ueno et al. | ................ 164/253 |
| 4,981,431 A | 1/1991 | Schmidt | ..................... 425/549 |
| 5,127,467 A * | 7/1992 | Ueno | ........................... 164/457 |
| 5,275,263 A | 1/1994 | Mezger | .................. 188/251 A |
| 5,350,007 A * | 9/1994 | Miki et al. | .................. 164/316 |
| 5,381,850 A | 1/1995 | Otte et al. | ................... 164/104 |
| 5,433,300 A * | 7/1995 | Barlow et al. | ............. 188/73.1 |
| 5,524,697 A | 6/1996 | Cook | ........................... 164/97 |
| 5,579,825 A * | 12/1996 | Shibata et al. | .............. 164/493 |
| 5,585,166 A * | 12/1996 | Kearsey | ....................... 428/212 |
| 5,620,042 A | 4/1997 | Ihm | ............................. 164/95 |
| 5,862,892 A | 1/1999 | Conley | ................. 188/218 XL |
| 5,887,684 A | 3/1999 | Döll et al. | .................. 188/71.1 |

FOREIGN PATENT DOCUMENTS

| | | | |
|---|---|---|---|
| DE | 1508767 | 11/1969 | |
| DE | 2264142 | 7/1973 | |
| DE | 2 264 142 B | 6/1975 | ........... C22C/39/00 |
| DE | 3546148 | 7/1986 | |
| DE | 3620510 | 1/1987 | |

(List continued on next page.)

OTHER PUBLICATIONS

A.B. Kuvaldin and A. Yu. Makarov, "Use of Heat Tubes in Direct Induction Heating Equipment", Electroktehnika, vol. 61, No. 7, pp. 71–73 (1990).

Primary Examiner—M. Alexandra Elve
Assistant Examiner—Kevin P. Kerns
(74) Attorney, Agent, or Firm—Ostrolenk, Faber, Gerb & Soffen, LLP

(57) ABSTRACT

A process and apparatus for producing a brake drum or a brake disc include a carrier component formed of a light metal alloy which can be easily cast and machined and a friction lining component formed of a light metal alloy reinforced by short non-metallic fibers or particles by casting a first one of the components in a mold, cooling the cast component to achieve dimensional stability, casting the other component onto or around the first component, the components being designed to interlock mechanically as a unitary composite structure after cooling. The casting materials may be introduced into the die in a molten state or a thixotropic state. Core pullers are provided to create space in the die cavity for the second component after the first component has been cast and cooled to a dimensionally stable state.

15 Claims, 2 Drawing Sheets

FOREIGN PATENT DOCUMENTS

| | | | | |
|---|---|---|---|---|
| DE | 4021910 | 1/1991 | | |
| DE | 4011948 | 10/1991 | | |
| DE | 4230609 | 4/1994 | | |
| DE | 4322113 | 12/1994 | | |
| DE | 44 00 898 | * 3/1995 | ........... | B61H/5/00 |
| DE | 4430957 | 3/1996 | | |
| EP | 0645205 | 3/1995 | | |
| EP | 0662361 | 7/1995 | | |
| EP | 0 662 361 A1 | 7/1995 | ........... | B22D/17/30 |
| EP | 0 725 697 B1 | 8/1996 | ........... | B22D/19/02 |
| GB | 2254814 | 10/1992 | | |
| GB | 2259878 | 3/1993 | | |
| JP | 60-231564 A | 11/1985 | ........... | B22D/17/22 |
| JP | 9500193 | 1/1997 | | |
| WO | 9501520 | 1/1995 | | |

\* cited by examiner

PROCESS AND DEVICE FOR PRODUCING A BRAKE DRUM OR BRAKE DISC

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

1. Field of the Invention

The invention relates to a process and a device for producing a brake drum or a brake disk comprising a carrier element made from a light metal alloy which is readily castable and machinable, and a friction lining made from a fiber- or particle-reinforced light metal alloy.

2. Related Art

An axle-mounted brake disk for rail vehicles is described in German Patent 44 00 898. The axle-mounted brake disk is produced as a monobloc disk or as a disk which is composed of a hub and friction ring, preferably with internal ventilation, and has hard ceramic particles dispersed in an aluminum alloy matrix. In this axle-mounted brake disk, it is intended that at least the friction ring, and preferably also the cooling ribs which are connected thereto, and/or also the hub should consist of a hypoeutectic AlSi-base alloy reinforced with hard ceramic particles. If the axle-mounted brake disk is comprised of a hub and friction ring, the components are screwed together.

Aluminum alloys which are reinforced with hard ceramic particles are very difficult to machine, however, and the solutions proposed in German Patent 44 00 898 require considerable machining. In the case of the monobloc disk, the hub, which also consists of the aluminum alloy reinforced with hard ceramic particles, has to be machined. In the disk which is composed of a hub and friction ring, the joint between the hub and the friction ring has to be machined. In both cases, this machining work is difficult to carry out owing to the aluminum alloy reinforced with hard ceramic particles which is used.

Accordingly, there is a need for a process and a device for producing a brake drum or a brake disk comprising a carrier element made from an inexpensive light metal alloy which is readily castable and machinable and has a wear-resistant friction lining made from a fiber- or particle-reinforced light metal alloy, and in which only the friction faces of friction linings must be machined.

EP 0 662 361 A1 describes a die-casting device for producing a metal object, having a ceramic filler pipe arranged in a bottom die, a ceramic filler plunger inside the filler pipe, a sliding annular seal between the filler pipe and the filler plunger, an induction coil which is positioned around the filler pipe in order to produce a pool of metal above the filler plunger, and a movable top die. In addition, vertical, insulated and water-cooled conductors are arranged in the filler pipe, so that the combined effect of the vertical conductors and the induction coil is to melt a slug which has been placed in the filler pipe with simultaneous turbulence and lifting of the molten material off the wall of the filler pipe.

BRIEF SUMMARY OF THE INVENTION

The process according to this invention comprises:

introducing a predetermined quantity of casting material for the carrier element in the form of a slug of light metal alloy into a filler pipe of a die, and melting the slug therein;

producing the carrier element in a die by moving the molten light metal alloy from the filler pipe into the die;

cooling the molten material to a temperature at which it is dimensionally stable;

introducing a slug of light metal alloy for the friction lining into the filler pipe of the die, and melting the slug therein;

immediately afterwards, casting the light metal alloy for the friction lining onto the carrier element by moving the molten light metal alloy from the filler pipe into the die; and cooling and removing the cast article.

According to either process described above, the materials may be introduced with the fill pipe in a molten state.

The process according to the invention makes it possible to produce a brake drum or a brake disk using a composite casting process. The fiber- or particle-reinforced light metal alloy friction lining is fixedly connected to the readily castable and machinable, as well as inexpensive, light metal alloy carrier element. Consequently, only the friction face of the friction lining requires special machining, while the machining steps for the carrier element do not entail any special costs and difficulties. Preferably, a short-fiber-reinforced light metal alloy can be used.

The carrier element or the friction lining can be produced in a first die, after which the casting-on or casting-around operation takes place in a second die.

Preferably, however, the carrier element or the friction lining is produced in a single die, with space created in this die for the friction lining or the carrier element, after the carrier element or the friction lining has cooled down, by moving parts of the die, in particularly core pullers, and the fiber- or particle-reinforced light metal alloy or the light metal alloy for the carrier element is introduced into this space.

A suitable hub structure ensures central access, which is optimum in terms of casting technology, for the metal which is to be cast on or around in the second cycle through the gates, which are easy to punch off.

In order to achieve a secure interlocking between the light metal alloy for the carrier element and the fiber and particle-reinforced light metal alloy during casting, projections, ribs and/or apertures may be provided, forming toothing between the light metal alloys which have been cast on or around one another.

It is particularly preferable if an intermetallic interlocking between the light metal alloy for the carrier element and the fiber- or particle-reinforced light metal alloy is produced during casting by means of a surface treatment carried out on the carrier element or the friction lining, this surface treatment preferably being exposure of the surface of the light metal alloy which is introduced into the die first to a flux, which may be present in a carrier fluid in the form of a suspension or a solution, immediately before the second light metal alloy is applied.

It is particularly preferable if the treatment with a flux is combined with the cooling of the light metal alloy which is introduced into the die first, by applying a flux-containing coolant, in particular flux-containing water, to this light metal alloy.

In order to reduce the oxidation of the surfaces of the carrier element and of the friction lining, a vacuum of 20 to 100 mbar absolute or protective gas comprising nitrogen or argon or the like can be applied to or introduced into the die shortly before casting.

Cooling of the light metal alloy which is introduced into the die first to a temperature at which it is dimensionally stable requires only small amounts of water, which evaporates immediately while the flux prepares the surface of this light metal alloy for casting on or casting around with the second light metal alloy. If necessary, compressed air may subsequently be applied to the cast surface. This allows the cooling and drying time to be reduced.

According to an advantageous casting process, individual slugs of a molten light metal alloy for the friction lining and fiber and particle reinforcement material may be introduced separately into a filler pipe on the die. The components may then be inductively heated, whereby the light metal alloy is mixed uniformly with the fiber and particle reinforcement material as a result of the turbulence in the melt brought about by the induction currents. Then, the mixed molten material may be introduced into the space which is provided for the friction lining. Therefore, it is not necessary to provide or obtain a composite light metal alloy which is already provided with fiber or particle reinforcement material, and one step in the overall process may be eliminated.

The fiber or particle reinforcement material is introduced into the light metal alloy by means of the molten flow when melting down the light metal alloy or by introducing the material into a turbulent flow of the melt, which is brought about by agitation from above or centrifugal force produced by the rotation or by it being injected through a channel in the casting plunger.

The casting process may be arranged in such a way that firstly, a slug of the light metal alloy for the carrier element is introduced into the filler pipe, and this slug is inductively melted and introduced into the space in the die which is provided for the carrier element. While the carrier element is cooling, space is created for the friction lining and new gates by moving core pullers. While this is being done, a slug of the light metal alloy for the friction lining and fiber or particle reinforcement material are introduced into the filler pipe, simultaneously or at different times, and the light metal alloy is inductively melted and is brought to the casting temperature and is mixed with the fiber or particle reinforcement material, simultaneously or successively. The melted and mixed material is then introduced into the space in the die which has been created for the friction lining.

When the thixocasting process is used, it is also possible to successively introduce a slug of the light metal alloy with thixotropic properties for the carrier element and a slug made from the light metal alloy for the friction lining with embedded fiber or particle reinforcement material into a filler pipe on the die. Then one or both slugs are is inductively heated to a temperature which lies above the solidus and below the liquidus, or to heat one of the slugs or both slugs to the melting temperature, and the heated material is pressed into the die in the pasty or molten state. In the case of light metal alloys without reinforcement material, the thixotropic state can be achieved by controlled cooling and holding in the solid-liquid two phase field and by simultaneous agitation. The agitation may be provided from above by means of a mechanical stirrer, or from below by means of the casting plunger in the filler pipe, or by the rotation of the filler pipe in the magnetic field inside the induction coil. By suitably designing a winding gradient of the induction coil, the vertical upward and downward movement of the shot sleeve containing the casting plunger in the coil is able to make the agitation movement more uniform given a constant temperature of the metal. By varying the induction frequency between 50 and 10,000 Hz, the stirring can be carried out in a controlled manner and in a very short time with moderate movement of the bath. The thixocasting process can be used particularly advantageously with a slug made from the light metal alloy for the friction lining with embedded fiber or particle reinforcement material, since this ensures that the homogeneity of the material for the friction lining is maintained. The slug of the light metal alloy for the carrier element may likewise be pressed into the die in the thixotropic state, but also in the molten state.

The device for producing a brake drum or brake disk according to this invention is comprised of a die having:

- a ceramic filler pipe which is arranged in a bottom die made from steel;
- a ceramic filler plunger in the filler pipe;
- a sliding annular seal between the filler pipe and the filler plunger and/or a fixed seal between the bottom die and the filler pipe, made from heat-resistant fiber material and/or from graphite and/or from ceramic/metal composite material;
- an induction coil which is positioned around the filler pipe and has a concentrated winding density in order to rapidly produce a pool of metal above the filler plunger;
- a movable top die made from steel or molding sand; and
- spaces in the bottom die and/or the top die for core pullers which make way for the carrier element or the friction lining.

By means of the induction coil, the light metal alloy for the carrier element and the fiber- or particle reinforced light metal alloy for the friction lining are heated to or held at the melting temperature or are heated to or held at a temperature which is above the solidus and below the liquidus, in order to press these alloys into the die cavity by means of the filler plunger.

The filler pipe and the filler plunger are comprised of ceramic material, in order not to produce any inductive heating in this area apart from in the light metal alloy which is situated inside the filler pipe.

The filler pipe containing the filler plunger is able to absorb verticsl, radical-concentric or radical-eccentric movements of linear or oscillating form on order to even out or optimize the efficency of the magnetic field inside the induction coil.

The spaces arranged in the bottom die and/or the top die for core pullers which make way for the carrier element or the friction lining are utilized when, after the first light metal alloy which was introduced into the die has cooled down, the second light metal alloy is introduced into these spaces which have been formed.

In order to control the cooling of the first light metal alloy introduced, the bottom die may preferably comprise a heated base and a cooled area which delimits the circumference of the casting, and the top die may also be heated. In view of the fact that the optimum casting temperature lies within a range from 550 to 750° C., the base of the bottom die and the top die may be heated to approximately 300° C., and the area which delimits the circumference of the casting may be cooled to 100° C. This allows optimized central feed-through and peripheral, controlled solidification. Insulating layers with sealing elements may be arranged between the die elements in order to maintain these different temperatures.

The seal between the filler pipe and the bottom die can advantageously be effected by means of a sealing bead which engages in a corresponding recess in the bottom die.

The formation of an oxide skin when heating the light metal slug and on the light metal alloy is prevented by applying a vacuum or by means of a protective gas comprising nitrogen or argon in the filler pipe.

Applying pressure to the light metal alloy through the gate openings in the die by means of the filler plunger can be carried out in a particularly advantageous manner if the filler plunger has a convex base. This filler plunger may have a concentric channel for injecting metallic or ceramic powders, fibers or liquids. This filler plunger may also be used as a squeezing plunger at the end of the casting operation, but it is also advantageously possible to arrange a squeezing plunger in the top die, coaxially with respect to the filler pipe. The squeezing plunger may be of two-part design, with a coaxial, displaceable core area. A concentric annular piston may then advantageously be used to shear, break or punch off the sprue.

Since the base of the bottom die is heated and the area of the bottom die which delimits the circumference of the casting is cooled, it is advantageous if these two parts of the bottom dies are divided from one another and if the base and/or the area are additionally divided in the radial direction, thus facilitating separating the die and making heat transfer through an air gap more difficult.

If a vacuum is applied to the die, it is possible to provide seals which enable a vacuum at levels as low as less than 30 mbar to be maintained.

Spraying the light metal alloy which was introduced into the die first with coolant and flux can be carried out by raising the top die and then spraying from outside, but it is preferable for the die to have a built-in device for spraying coolant and/or flux. This makes it possible to spray only those surface areas of the light metal alloy introduced into the die first which come into contact with the light metal alloy which is introduced subsequently.

BRIEF DESCRIPTION OF THE DRAWINGS

The invention is explained in more detail below with reference to two exemplary embodiments which are illustrated in the drawing, in which.

Figure 1:
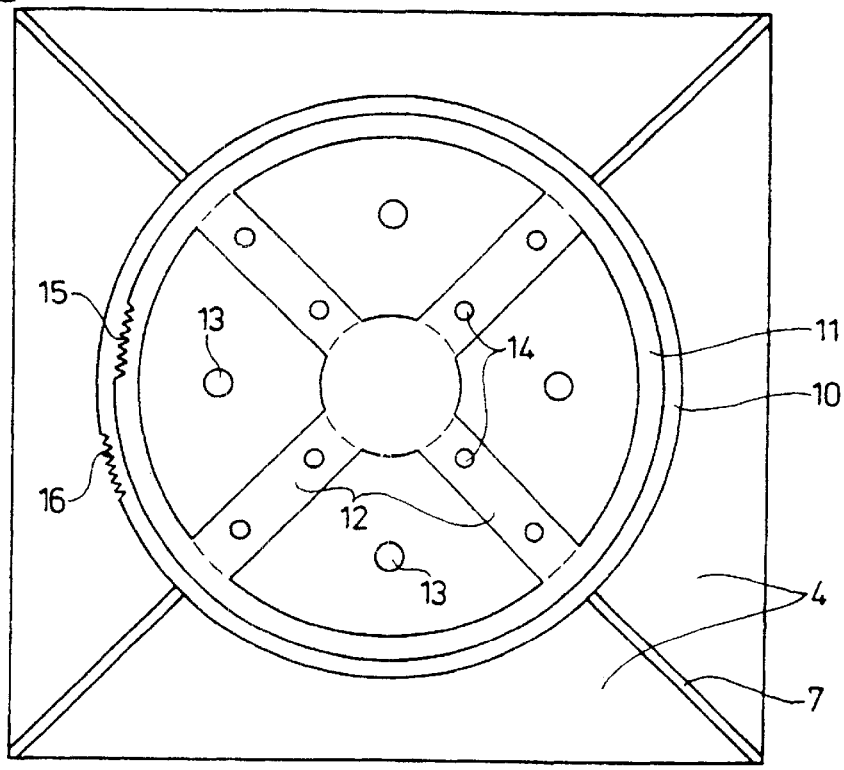
FIG. 1 shows a plan view of a bottom die containing a casting in the form of a brake drum.
Figure 2:
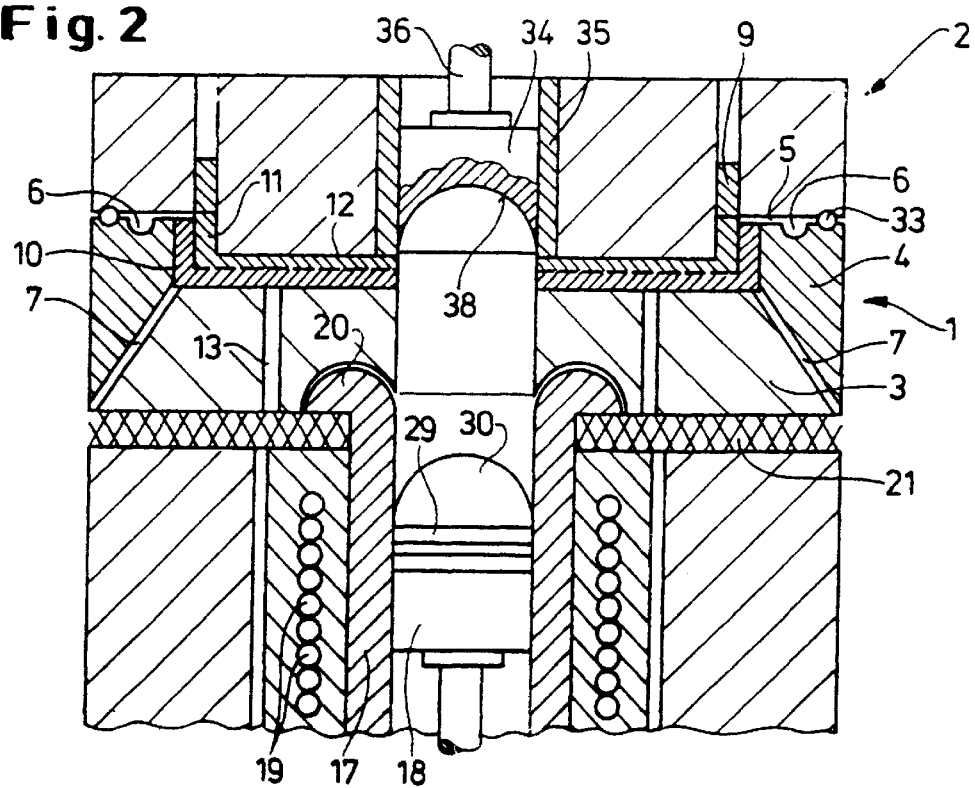
FIG. 2 shows a cross section through the closed die, including filler pipe, filler plunger and induction coil.

It can be seen from FIGS. 1 and 2 that a casting in the form of a brake drum comprising a carrier element 10 and a friction lining 11 is produced in a die comprising a bottom die 1 and a movable top die 2.

The bottom die 1 comprises a base 3 which is heated to approx. 300° C. and a side die 4 which is cooled to approx. 100° C. and is arranged in the area which forms the circumference of the casting 10, 11.

The bottom die 1 and the top die 2 are separated by a horizontal contour parting line 5, in the faces of which air gaps 6 for venting the die during casting are arranged. An inclined function parting line 7 runs between the base 3 and the side die.

An annular core puller 9 is arranged in that area of the top die 2 in which the space for the friction lining 11 is to be formed. Furthermore, radially running core pullers (not shown) are provided, which make way for radial channels 12 which serve as runners for the light metal alloy for the friction lining. Ejectors 13 are arranged in the usual way in the base 3 of the bottom die 1.

Core pullers are arranged in the region of the radial channels 12, in the form of pins 14. During the introduction of the aluminum alloy for the carrier element 10, pins 14 keep a number of bores in the region of the channels 12 open. These are subsequently pulled out in order to allow the aluminum alloy for the friction lining 11 to be introduced. Filling of these bores with the aluminum alloy for the friction lining 11 results in a mechanical interlocking with the aluminum alloy for the carrier element 10.

Similar mechanical interlocks are brought about by means of circumferential toothing 15 in the area between the carrier element 10 and the friction lining 11. Furthermore, the outer circumference of the carrier element 10 may, by suitably designing the side die 4, be provided with ribbing 16 in order to allow better heat dissipation through the carrier element 10 during solidification of the friction lining 11.

A ceramic filler pipe 17 is arranged beneath the base 3 of the bottom die 1 and engages, by way of a sealing bead 20, in a corresponding annular recess in the base 3. A convex, ceramic filler plunger 18 is arranged in the filler pipe 17. Filler plunger 18 can be moved in the axial and radial directions, in a manner which is not shown, in order to introduce the aluminum alloys for the carrier element 10 and for the friction lining 11 into the die 1, 2. The filler plunger 18 is sealed with respect to the filler pipe 17 by means of an easily replaceable seal 29, which may comprise a piston ring or preferably heat-resistant fiber material and/or ceramic and/or heat-resistant metal and/or ceramic/graphite metal composite. The seal may alternatively be comprised of washers arranged one behind the other in the axial direction.

An induction coil 19 with an axial winding profile is positioned around the filler pipe 17 and serves to heat, melt and stir the aluminum alloys for the carrier element 10 and the friction lining 11, by means of induction currents, within a period of less than 10 minutes.

In order to make the heating of the alloy more intensive and more even, the filler pipe 17, containing the alloy and filler plunger 18, may be removed from the seal 29 and moved in the axial and radial directions in the magnetic field of the induction coil 19. For this purpose, the electric frequency of the induction current may be varied continuously or discretely between 50 Hz and 5000 Hz.

If the aluminum alloys for the carrier element 10 and for the friction lining 11 are introduced into the filler pipe 17 in the molten state, the heat generated by the induction coil 19 serves to maintain the temperature of the melt and to induce turbulence in the melt, resulting in intimate mixing of the aluminum matrix alloy for the friction lining 11 with the fiber or particle reinforcement material. Since this mixing is highly intensive, it is possible to introduce the aluminum alloy for the friction lining 11 into the filler pipe 17 separately from the fiber or particle reinforcement material and to mix these materials only when they are inside the filler pipe. This "in situ" production of the composite material for the friction lining 11 may be brought about by simultaneous heating and/or by injecting (pressing) the fibers or particles into the liquid aluminum alloy and/or by introducing the fibers or particles into the surface of the melt, which is made turbulent by means of a stirrer situated above it.

A powerful induction coil 19 allows the light metal alloys for the carrier element 10 and the friction lining 11 to be introduced into the filler pipe 17 in the form of slugs. These may be melted in this filler pipe and then introduced into the die 1, 2 by displacement of the filler plunger 18. In this case, the slugs may also have already been preheated to a temperature which lies slightly below the solidus, so that they can be heated to the casting temperature by the induction coil 19 as quickly as possible and with a low level of power consumption. In this case too, the aluminum alloy for the friction lining 11 and the fiber or particle reinforcement material may be introduced separately into the filler pipe 17 and be intensively mixed with one another during melting as a result of the turbulence which is brought about by the induction currents.

Finally, it is also possible to use the thixocasting process, by heating thixotropic slugs which have been placed in the filler pipe 17, in the magnetic field, to a temperature which lies between the solidus and the liquidus, and to press the material into the die 1, 2 in the semiliquid state. For die-casting purposes, the thixotropic state for commercial light metal alloys in slug form may also be brought about in situ by controlled cooling from the liquid state, just above the melting temperature, to the pasty state between the solidus temperature and the liquidus temperature. In this case, an axial and/or radial movement of the filler pipe 17 containing the filler plunger may be used to assist the process.

Naturally, it is also possible to press only one of the two light metal alloys into the die in the molten state, while the other of the two light metal alloys is pressed into the die in the semiliquid state.

The particular process employed is dependent on the properties of the particular light metal alloys used, which may be identical or different.

A counterpressure plunger 34 with a concave base 38 is arranged in a cylindrical sliding tool 35 which can be used as a punching tool for shearing off the sprues extending from channels 12. A connection 36 for applying a vacuum to the die cavity or for introducing a protective gas is situated on the plunger 34. In order to be able to maintain a vacuum of below 30 mbar, vacuum seals 33 are arranged in the contour parting line 5.

Figure 4:
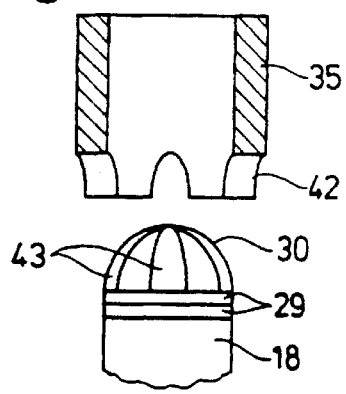
FIG. 4 shows a detailed view of a sliding tool and a filler plunger.

It can be seen from FIG. 4 that the sliding tool 35 may have cutouts 42 which are matched to the sprues in channels 12, so that the sliding tool 35 can be used as a punching tool. The convex base 30 of the filler plunger 18 may have corresponding recesses 43 in order to guide the molten or thixotropic light metal alloy toward the cutouts 42 and thus toward the gates of the channels 12 during squeezing by means of the counterpressure plunger 34.

Figure 3:
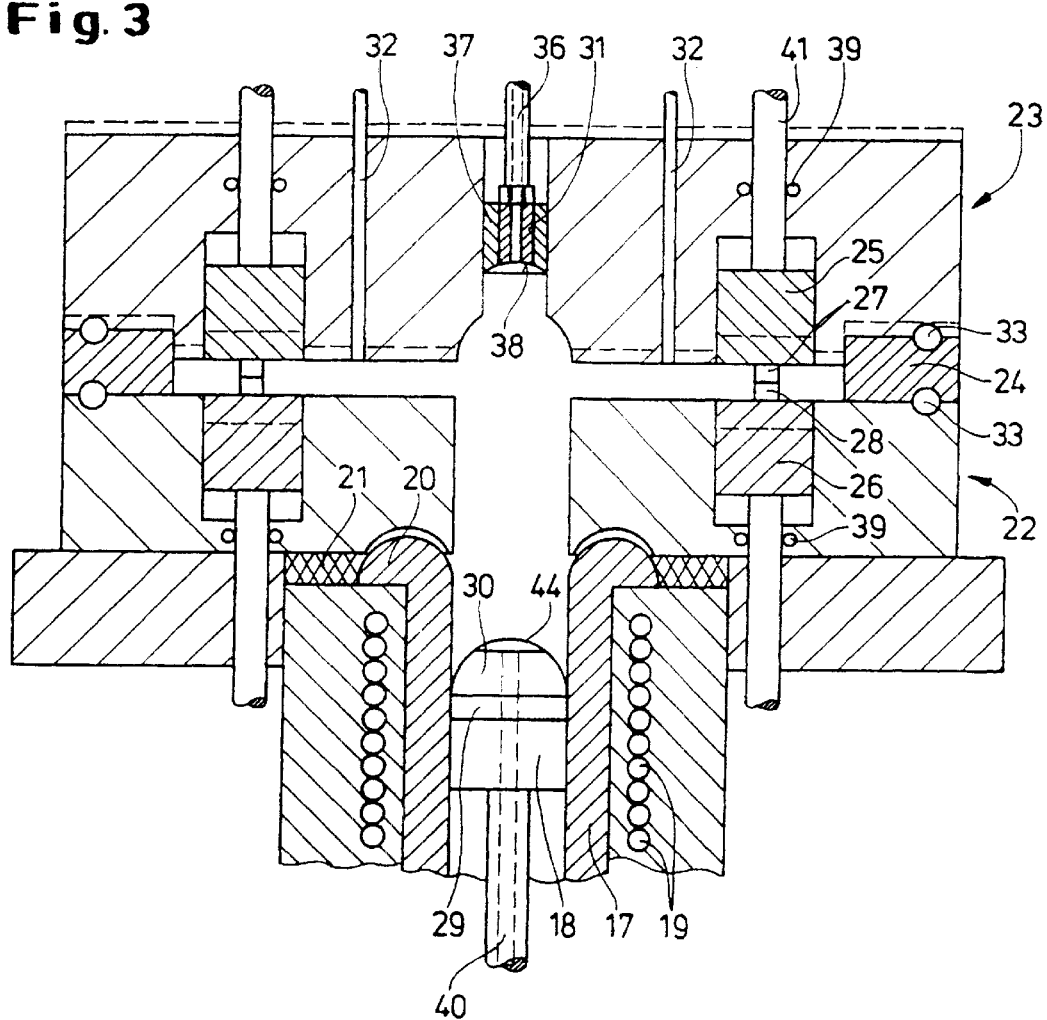
FIG. 3 shows a cross section through a die, including filler pipe, filler plunger and induction coil, for producing a brake disk.

FIG. 3 shows a die set for producing a brake disk with friction linings, in the form of friction disks, which are arranged on the side faces on both sides.

The figure illustrates the position of the dies for casting of the carrier element in solid lines, while the position for casting of the friction linings is shown in dashed lines. The die set comprises a heated bottom die 22, a heated top die 23 and a cooled side die 24. An upper, annular core puller 25 is arranged in the top die 23, while a corresponding, coaxial, annular, lower core puller 26 is situated in the bottom die 22. In the position illustrated in FIG. 3, the free surfaces of the core pullers 25, 26 are adjacent to the side faces of the disk-shaped carrier element which is defined by the bottom die 22 and the top die 23.

Pins 27, 28, which form cores for bores in the disk-shaped carrier element, are arranged on the circumference of the core pullers 25, 26. In the position illustrated pins 27, 28 are in contact with one another. The core pullers 25, 26 are actuated by means of pressure bars 41 extending through the bottom die 22 and the top die 23. Pressure bars 41 are sealed by means of vacuum seals 39.

As described above, the light metal alloy for the carrier element is heated to the casting temperature in the filler pipe 17 by means of the induction coil 19 and is pressed into the die cavity by means of the filler plunger 18. In the process, bores in the disk-shaped carrier element are formed in the region of the pins 27, 28.

A two-part squeezing plunger, comprising an inner plunger 31 with a connection 36 for applying a vacuum or for introducing a protective gas, and an outer annular plunger 37, both with a concave base 38, are arranged in the top die.

In the filler plunger 18, there is a channel 40 through which fiber or particle reinforcement material can be introduced into the filler pipe 17. A closure cap 44, which has the convex contour of the plunger base 30, serves to close off the channel 40.

After the die 22, 23 has been filled, the top die 23 is moved into the position which is illustrated in dashed lines, and cooling water mixed with flux is applied to the surfaces of the disk-shaped carrier element using spray devices 32. The core pullers 25, 26 are retracted into the position shown in dashed lines, so that they clear a space for the friction lining, and the light metal alloy for the friction lining containing the fiber or particle reinforcement material is pressed into these spaces by means of the filler plunger 18. As described, the light metal alloy containing the fiber or particle reinforcement material either flows into the area of the spaces for the friction linings through the gap which is formed when the top die 23 is raised or reaches these spaces via channels which have been cleared by means of special, additional core pullers (not shown). In order to achieve a pore-free structure, the squeezing plunger 31, 37 is arranged in the top die 23 and, after introduction of the light metal alloys has been completed, applies an increased pressure to the molten material until the alloys have solidified. The geometry of the end face of the squeezing plunger 31, 37 is matched as the inverse image of that of the filler plunger 18, in order to utilize the pressure in front of the gates. In order to intensify this effect, it is possible to provide a central, metal squeezing pin and/or spindle drive which follows a pneumatic/hydraulic drive.

In the die in accordance with FIG. 3 as well, a magnetic screen 21 is arranged between the induction coil 19 and the bottom die 22, although this can be dispensed with if the bottom die 22 consists of an electrically nonconductive material.

The fiber or particle reinforcement material can be introduced into the filler pipe 17 through a channel 40 in the filler plunger.

Since predetermined quantities of the light metal alloys for the carrier element and for the friction lining can be introduced into the filler pipe 17, e.g. in the form of a preheated slug of molten material, a brake drum or a brake disk can be produced with a rapid cycle time and without the need for high filling pressures. If necessary, the squeezing can be carried out using the filler plunger.

In order to match the melting time in the coil and the solidification time in the die, it is possible to arrange two to four induction coils, which operate cyclically, in the form of a revolver beneath the die.

It is possible to use a very wide range of aluminum and magnesium alloys, and suitable fiber or particle reinforcement materials are silicon carbide, tungsten carbide, silicon nitride, aluminum nitrite, titanium boride, titanium nitrite and other such materials, the fiber reinforcement material preferably comprising short fibers, while fluxes which can be used are aluminum sodium fluoride, sodium iodide, potassium iodide, etc., in each case dissolved and/or dispersed in water.

What is claimed is:

1. A die casting process for producing a composite two-component friction member for a brake including a light metal alloy carrier component and a friction lining component comprised of a light metal alloy and an internal reinforcing filler, the process comprising the steps of:

introducing a predetermined quantity of a first casting material into a filler pipe of a die;

transferring the first casting material from the filler pipe into the die in a molten state to form one of the two components of the friction member;

cooling the molten material in the die to a temperature at which the one component is dimensionally stable;

preparing a predetermined quantity of a second casting material for forming the other of the two components of the friction member;

transferring the second casting material in a heated state into a die cavity containing the dimensionally stable first component to form a composite structure of the first and second components;

cooling the composite structure; and separating the die and the composite structure, and in which:

the predetermined quantity of first casting material is the light metal alloy for the carrier component;

the predetermined quantity of first casting material is introduced into the filler pipe in the form of a solid;

the first casting material is inductively heated in the filler pipe before transfer to a space in the die which is provided for the carrier component;

after the cast carrier component has been cooled to a state of dimensional stability, a space for the friction lining component is cleared within the die cavity by moving at least one core puller;

while the carrier element is being cooled and the space in the die cavity is being cleared, the predetermined quantity of the second casting material for the friction lining is introduced into the filler pipe;

the second casting material is inductively heated within the filler pipe; and the inductively heated second casting material is transferred to the space in the die which has been cleared for the friction lining component.

2. The process as claimed in claim 1, in which the first casting material is inductively heated to the molten state before it is transferred to the die.

3. The process as claimed in claim 2, in which the second casting material is inductively heated to the molten state before it is transferred to the die.

4. The process as claimed in claim 1, in which the second casting material is inductively heated to the molten state before it is transferred to the die.

5. The process as claimed in claim 1, in which the first casting material is transferred to the die in a thixotropic state.

6. The process as claimed in claim 5, in which the second casting material is transferred to the die in a thixotropic state.

7. The process as claimed in claim 1, in which the second casting material is transferred to the die in a thixotropic state.

8. The process as claimed in claim 1, in which:

the light metal alloy for the friction lining component and the filler are separately introduced into the filler pipe as the second casting material;

the second casting material is inductively heated in the filler pipe to the molten state for the light metal alloy thereof;

the molten light metal alloy and the filler are mixed by turbulence caused by the inductive heating; and the second casting material is transferred to the die after the molten light metal alloy and the filler have been mixed.

9. The process as claimed in claim 8, in which the mixture of the molten light metal alloy and the filler are cooled to a thixotropic state before being transferred to the die.

10. A die casting machine for producing a composite two-component friction member for a brake including a light metal alloy carrier and a friction lining comprised of a light metal alloy and an internal reinforcing filler, the machine being comprised of:

a bottom die;

a filler pipe in communication with the bottom die;

a filler plunger movably positioned in the filler pipe;

a sealing structure for the filler plunger;

an induction coil positioned to heat metal contained in the filler pipe;

a top die, the top and bottom dies being movable relative to each other to form a cavity that defines the shape of the friction member;

a plurality of movable core pullers positioned in passages located in at least one of the dies, the core pullers being operative after molten casting material for forming a first component of the friction member has been introduced into the bottom die and cooled to the point of dimensional stability, to clear a space into which molten casting material for forming a second component of the friction member may be introduced, and in which:

the bottom die comprises a heated base and a cooled area which delimit the circumference of the casting;

the base of the bottom die and the top die are heated to approximately 300° C.; and the area which delimits the circumference of the casting is cooled to 100° C.

11. A die casting machine for producing a composite two-component friction member for a brake including a light metal alloy carrier and a friction lining comprised of a light metal alloy and an internal reinforcing filler, the machine being comprised of:

a bottom die;

a filler pipe in communication with the bottom die;

a filler plunger movably positioned in the filler pipe;

a sealing structure for the filler plunger;

an induction coil positioned to heat metal contained in the filler pipe;

a top die, the top and bottom dies being movable relative to each other to form a cavity that defines the shape of the friction member;

a plurality of movable core pullers positioned in passages located in at least one of the dies, the core pullers being operative after molten casting material for forming a first component of the friction member has been introduced into the bottom die and cooled to the point of dimensional stability, to clear a space into which molten casting material for forming a second component of the friction member may be introduced; and a magnetic screen between the induction coil and the bottom die.

12. A die casting machine for producing a composite two-component friction member for a brake including a light metal alloy carrier and a friction lining comprised of a light metal alloy and an internal reinforcing filler, the machine being comprised of:

a bottom die;

a filler pipe in communication with the bottom die;

a filler plunger movably positioned in the filler pipe;

a sealing structure for the filler plunger;

an induction coil positioned to heat metal contained in the filler pipe;

a top die, the top and bottom dies being movable relative to each other to form a cavity that defines the shape of the friction member;

a plurality of movable core pullers positioned in passages located in at least one of the dies, the core pullers being operative after molten casting material for forming a first component of the friction member has been introduced into the bottom die and cooled to the point of dimensional stability, to clear a space into which molten casting material for forming a second component of the friction member may be introduced; and a squeezing plunger disposed in the top die and positioned coaxially with respect to the filler pipe; and in which the squeezing plunger includes a portion operative as a punching tool for sprues formed on the first and second components of the friction member.

13. The device as claimed in claim 12, in which the squeezing plunger is comprised of an inner part and a concentric annular part, the annular part being operative as the punching tool.

14. A die casting machine for producing a composite two-component friction member for a brake including a light metal alloy carrier and a friction lining comprised of a light metal alloy and an internal reinforcing filler, the machine being comprised of:

a bottom die;

a filler pipe in communication with the bottom die;

a filler plunger movably positioned in the filler pipe;

a sealing structure for the filler plunger;

an induction coil positioned to heat metal contained in the filler pipe;

a top die, the top and bottom dies being movable relative to each other to form a cavity that defines the shape of the friction member;

a plurality of movable core pullers positioned in passages located in at least one of the dies, the core pullers being operative after molten casting material for forming a first component of the friction member has been introduced into the bottom die and cooled to the point of dimensional stability, to clear a space into which molten casting material for forming a second component of the friction member may be introduced; and a squeezing plunger disposed in the top die and positioned coaxially with respect to the filler pipe; and in which the squeezing plunger is comprised of an inner part and a concentric annular part, the annular part being operative as a punching tool for sprues formed on the first and second components of the friction members.

15. A die casting machine for producing a composite two-component friction member for a brake including a light metal alloy carrier and a friction lining comprised of a light metal alloy and an internal reinforcing filler, the machine being comprised of:

a bottom die;

a filler pipe in communication with the bottom die;

a filler plunger movably positioned in the filler pipe;

a sealing structure for the filler plunger;

an induction coil positioned to heat metal contained in the filler pipe;

a top die, the top and bottom dies being movable relative to each other to form a cavity that defines the shape of the friction member;

a plurality of movable core pullers positioned in passages located in at least one of the dies, the core pullers being operative after molten casting material for forming a first component of the friction member has been introduced into the bottom die and cooled to the point of dimensional stability, to clear a space into which molten casting material for forming a second component of the friction member may be introduced;

a squeezing plunger; and an actuator for the squeezing plunger, and in which:

the bottom die includes a base portion and a side portion which delimits the circumference of the casting; and the top die, the base and side portions of the bottom die, the core puller and the actuator of the squeezing plunger include seals for maintaining a vacuum within the die cavity.

* * * * *